May 26, 1953 — F. L. SHANDS — 2,639,609
APPARATUS FOR DETERMINING BOILING POINTS
Filed June 3, 1947 — 2 Sheets-Sheet 2
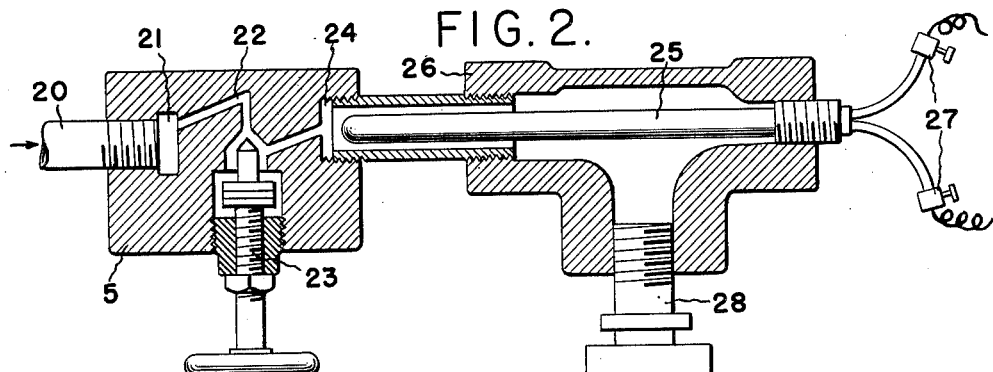
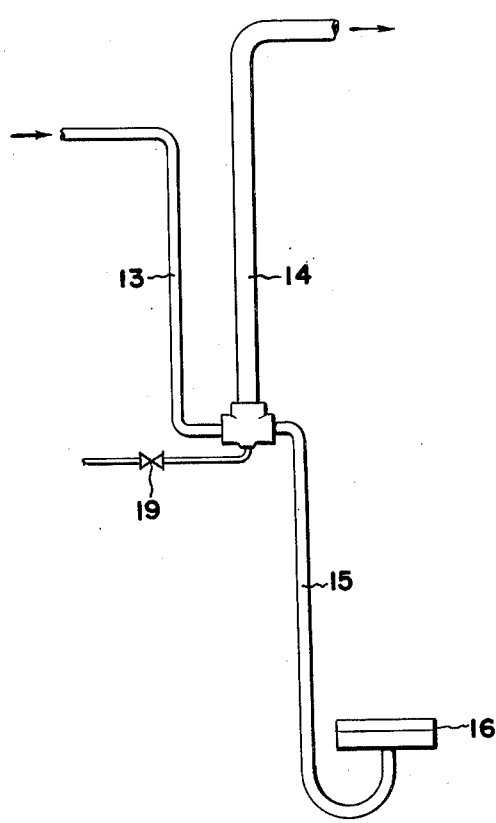
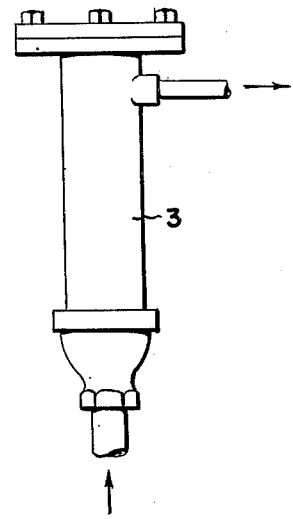
INVENTOR.
Frederick L. Shands
BY
ATTORNEY Patented May 26, 1953

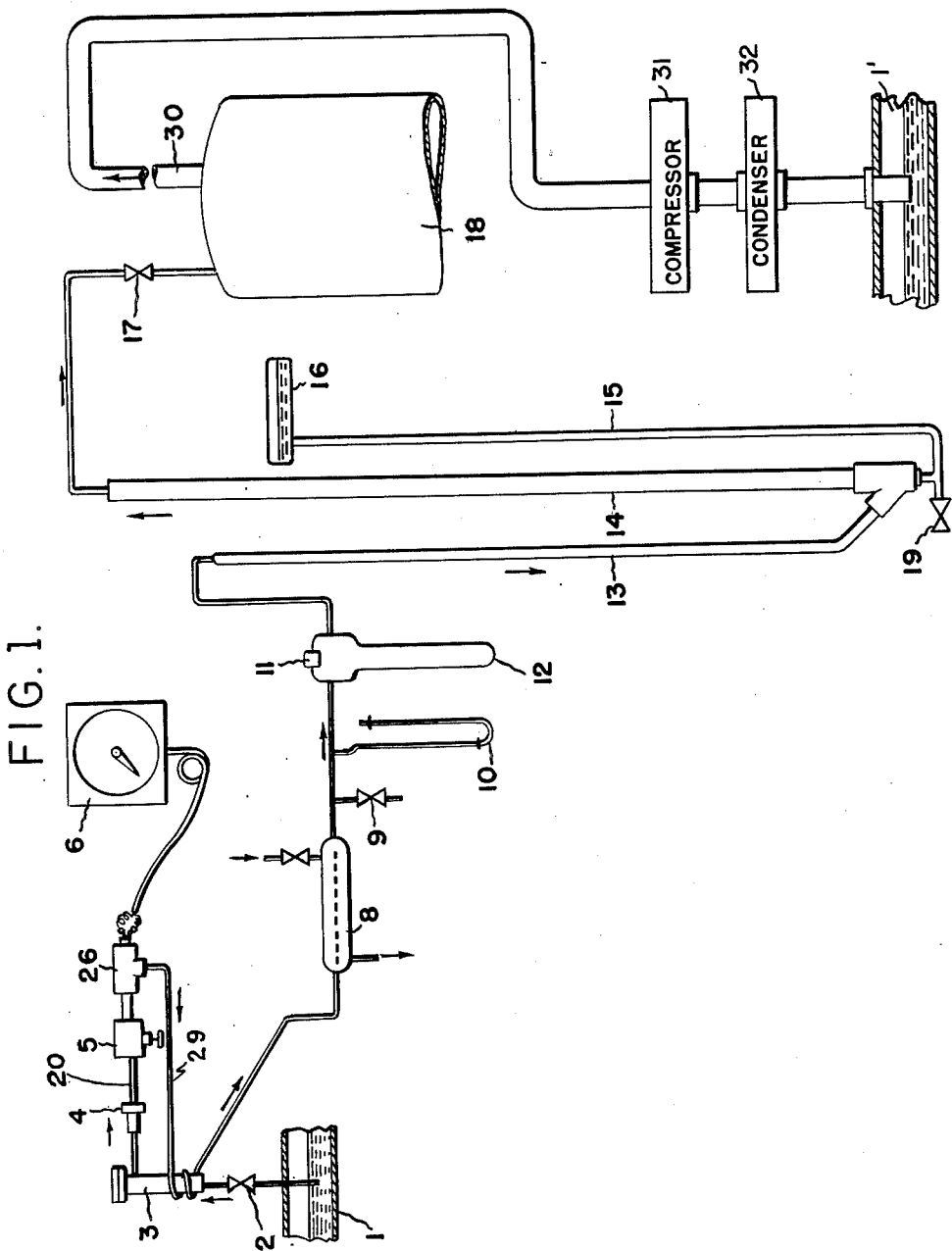

2,639,609

UNITED STATES PATENT OFFICE 2,639,609

APPARATUS FOR DETERMINING BOILING POINTS

Frederick L. Shands, Newburgh, N. Y., assignor, by mesne assignments, to E. I. du Pont de Nemours and Company, a corporation of Delaware Application June 3, 1947, Serial No. 752,197

2 Claims. (Cl. 73—17)

This invention relates to the continuous evaluation of conditions existing in the process of manufacturing chemical compounds, and particularly organic compounds. By the means of this invention, the extent of the reaction and the determination of the optimum conditions for carrying out the several process steps can be ascertained by determining the boiling point (and therefore composition) of the crude product, since the boiling point bears a definite relationship to both of these factors. Control steps can then be taken in accordance with the variations in such crude product boiling-point determinations.

This invention is applicable to closed systems, and particularly to those operating under pressures greater than atmospheric. And, with some slight modification as indicated hereinafter, the invention is also applicable to a system operated under vacuum, particularly one operating under moderate vacuum.

Heretofore it has been the practice to manually withdraw crude product samples from a valved sample line connected to the reaction system. This practice is objectionable for various reasons. It is time consuming and uneconomical. There is a product wastage from frequent sample taking. Also, the manual procedure is inherently inaccurate because of lack of control of conditions where a simple thermometer method or the like is used, and errors of greater than 5% magnitude in product purity determinations are frequent.

A principal object of the present invention is to provide a continuous automatic indication of the boiling point of the crude product while the manufacturing operation is in progress.

A further object is to correct inaccuracies in the usual manual system of testing by providing constant pressure and controlled temperature conditions for the sample increment under test.

A still further object is to provide a means of returning the crude product test increment to the manufacturing process after determination of its composition rather than discard it as is the practice in manual testing.

Another object is to reduce to a minimum the manual labor required in composition testing operations.

Still another object is to provide means for permanently recording the several boiling points and thereby secure information of a process control nature which will permit duplication of manufacturing operations in subsequent manufacturing runs.

According to my invention these objects are accomplished by providing an independent closed testing circuit, which automatically maintains its internal pressure and temperature, automatically and continuously determines and maintains a record of crude product boiling points, and furthermore automatically returns the test material to the manufacturing system without interrupting the progress of the manufacturing process.

This invention is illustrated by way of examples in the accompanying drawings in which:

Fig. 1 is a diagrammatic representation of a sampling circuit showing the assembly of the various elements of a preferred arrangement.

Fig. 2 is a detailed view of the reducing valve thermocouple subcombination.

Fig. 3 is a detailed view showing the construction of a drying chamber which may be used in combination with the equipment assembly shown in Fig. 1, and Fig. 4 is a diagrammatic representation of an embodiment of the pressure controlling-sealing device which is capable of use in the sampling of circuits operating under vacuum as distinguished from those operating under pressure.

A principal purpose of the assembly of equipment shown in Fig. 1 is that of continuously vaporizing representative samples of product under a constant pressure, the boiling points (and, therefore, the compositions) being continuously determined and recorded by a thermocouple-actuated instrument, the indicating thermocouple junction being located at the point where the controlled vaporization occurs. Means for maintaining close control of pressure also is one feature of this combination. Furthermore, auxiliary equipment is provided for the control of temperature and flow rate throughout the circuit. A vaporizer and a pressure control-sealing means are positioned in the line of flow to effect return of the vaporized material to the manufacturing system at a point of lower pressure than that maintained in the test circuit whereby process interruptions and interference are avoided.

Under constant pressure conditions the boiling point of the material tested will vary in accordance with its composition and such variations in boiling point are indicative of the progress of the reaction producing the sample material.

In some cases the material to be tested contains small amounts of water which are not substantial enough to affect the boiling point appreciably by their presence but which may freeze out at the controlled vaporization point over relatively long periods of time and finally obstruct the flow of sample material unless removed at least to some degree. Similarly, the product material may contain traces of foreign solid substances, such as iron rust flakes, which, although they have absolutely no effect on the boiling point of the material, may cause clogging troubles unless removed at some point prior to the vaporization point.

With reference to the diagrammatic view shown in Fig. 1 of the drawing, as applied to the determination and control of conditions in chemical processes generally, the liquid sample material may be withdrawn from the process pipe line 1, under pressure, at approximately the same composition as the material existing in the reaction zone. The sample of crude product (e. g., a halogenated hydrocarbon compound) is then passed through dryer 3 to remove surplus water, and through filter 4 to remove any foreign particles or the like that may be present. Both of these devices are maintained at approximately the same temperature as that of the boiling liquid. The pressure of the liquid is then reduced by passing through control valve 5 to produce a liquid-vapor phase before the boiling point is determined and recorded by instrument 6.

The equilibrium liquid-vapor product then is passed through line 29 which is coiled about dryer 3 in heat-transfer relationship, whereby the entering product from line 1 is cooled to equilibrium temperature before it is thereafter expanded by control valve 5 to the controlled system pressure. After traversing the coils the liquid-vapor product flows to steam-jacketed vaporizer 8 where the liquid portion is completely vaporized.

An important consideration in the design of the piping system from the control valve 5 through the system to the pressure controlling-sealing device 13, 14, 15, hereinafter described, is the maintenance of the system pressure at as near a constant level as possible, since variations in this pressure will be reflected in the boiling points progressively determined. Since the flow rate of the sample material past valve 5 varies only as the square root of the pressure differential across valve 5 considerable pressure variation in the pipe line 1 and the piping up to valve 5 can be tolerated without the introducion of serious error.

The piping system past valve 5 should be constructed to permit near-constant pressure maintenance throughout by choosing tubing of ample size to accommodate all the flow rates which are encountered in the particular manufacturing system to which this invention is applied. In this connection it has been found that ¼ inch diameter tubing was a very satisfactory size for dichlorodifluoromethane flowing at a rate of 1 to 2 liters per minute. Also, any flow interference past valve 5 should be minimized and flow rate determination devices of a size permitting indication at relatively low pressure differential ranges of, say ½ inch to 2 inches of water, are preferred.

The completely vaporized product next passes through orifice 11 to determine its rate of flow by registering a pressure differential on manometer 12 and then is passed through the pressure controlling-sealing device 13, 14, 15 to low pressure receiver 18 in which the returned sample gases are mixed with the main reaction stream of the manufacturing system.

As a more specific illustration of this invention as applied to the manufacture of dichlorodifluoromethane and described with reference to Fig. 1 of the accompanying drawing, the liquid sample material is withdrawn from the process pipe line 1 which, in present practice, is located on the pressure side of a reciprocating compressor which compresses crude product gases to 30 to 80 lbs./sq. in. gage for subsequent condensation with —20 degrees C. calcium chloride brine. The time interval involved in the passage of the product as a gas through the reaction system to the compressor is very short (less than one minute) so that the liquid sample as withdrawn has very nearly the same composition as the material leaving the reaction zone. Process line 1 is positioned in a horizontal plane, with valves downstream from the sample device take-off causing the line to be partially filled with liquid crude product to facilitate drawing a sample through the test circuit even at the lowest production rates.

The sample withdrawal pipe is positioned some distance above the bottom of 1 as shown to prevent carryover of pipe scale or other foreign particles which might clog the test system. Material in pipe 1 is under a varying pressure of 30 to 80 lbs./sq. in. gage. Preferably the pressure in 1 should not be much below about 30 lbs./sq. in. gage.

Valve 2 is provided in the sample withdrawal line to shut off flow through the entire sampling circuit when repairs or adjustments are to be made. Normally, when the sampling circuit is in use, valve 2 should be wide open.

From valve 2 the sampling line enters dryer 3 which may be a section of pipe fitted with a reducer at its lower end for connection with the sample withdrawal line and fitted with a flange and a closing blank flange at the opposite end. The crude product contains a small amount of water which has been found to freeze at the reducing valve 5 and cause interruption of sample flow, and for this reason dryer 3 is provided in the line to remove such water. Dryer 3 may be packed with loose activated silica gel or other drying agent non-reactive with the sample material, or the drying agent may be placed in a permeable cloth sack, permitting its ready removal and replacement when it has become saturated and no longer effective. Dryer 3 is maintained at approximately the same temperature as that of the boiling liquid under the controlled circuit pressure by wrapping it with several turns of the tubing comprising the exit line pipe from reducing valve 5. To facilitate such temperature control this section of the exit line may be a length of product-resistant, heat-conducting, plastic tubing.

From the dryer 3 the liquid product flows through filter 4 which may conveniently be a pipe union containing a tight roll of laboratory filter paper (about ⅜" in diameter by 1" in length) wedged tightly in place. The filter is effective in removing any foreign particles which may interfere with the operation of reducing valve 5.

The liquid product continues on its way through pipe 20 into reducing valve 5 (shown in detail in Fig. 2), entering at 21 into the narrow inlet passage 22, and thence past the seat portion of needle valve stem 23. Valve 5 is manually adjusted to a degree of opening which reduces the pressure on the liquid product from the initial 30 to 80 lbs. pressure to the constant pressure maintained in the balance of the sampling circuit, generally 8 to 10 lbs./sq. in. gage at a flow rate, when fully vaporized, of 1 to 2 liters per minute, the preferred rate of flow which permits attainment of equilibrium conditions in the vaporization of material at the point where the flashing liquid impinges on thermocouple bulb 25.

Thermocouple bulb 25 is conveniently positioned in the pipe T 26, which is connected to reducing valve 5 by a short nipple. The end of the thermocouple bulb is spaced a short distance from the entrance end of the expansion chamber 24. Here a portion of the liquid product flashes and a two-phase equilibrium liquid-vapor state is produced at the constant system pressure. The temperature at this point will vary in accordance with variations in the composition of the liquid product. The temperature of the boiling mixture is continuously indicated and recorded by a conventional temperature indicating and recording instrument 6 connected to the thermocouple leads through binding posts 27.

The equilibrium liquid-vapor product leaves T 26 through nipple 28 and line 29, the latter line being coiled in several turns about dryer 3 to cool the product withdrawn from line 1 to the equilibrium temperature before it is expanded to the controlled system pressure. It has been found that even if dryer 3 is thoroughly lagged with insulation the temperature at this point will be somewhat higher than the equilibrium temperature unless the cooling coil is so employed, which may introduce error in the boiling point determination by promoting flashing and thereby changing the liquid composition prior to the boiling temperature determination. After traversing the coils about 3 the liquid-vapor product enters steam heated vaporizer 8 where it is completely vaporized. Vaporizer 8 may conveniently comprise a short section of steam-jacketed pipe, the heating being accomplished indirectly to prevent contamination of the product with condensate water.

The vapor product next passes through orifice 11 to determine its flow rate by registering a pressure differential on water-filled manometer 12, the legs of which are connected across the orifice, and then passes through the pressure controlling-sealing device 13, 14, 15 past valve 17 and into low pressure receiver 18 in which the returned sample gases are collected for return to the main reaction gas stream. This return may be effected by withdrawal of vapors through line 30 located on the suction side of a compressor which delivers the product at main system pressure.

According to an installation as illustrated in Figure 1 and in operation in 1946, the diameter of the several legs, 13, 14 and 15, of the pressure controlling and sealing circuit were ½ inch, 1½ inches, and ½ inch respectively, and the approximate diameter of reservoir 16 was 16 x 16 inches. The cross-section of the reservoir was therefore of such magnitude relative to the diameter of pipes 13, 14 and 15 that a change in pressure in the main line causes no appreciable variation in the level of the liquid in the reservoir 16, thus maintaining a constant pressure in the testing system.

According to this installation, the volatilized sample was received in expansion chamber 18, from which it was withdrawn through pipe 30 and returned to the system at 1' through compressor 31 and condenser 32 as shown diagrammatically in Figure 1.

Valve 9 in the line leaving vaporizer 8 permits draining the entire sampling circuit. Mercury-filled manometer 10, one leg of which is open to atmospheric pressure, is provided for the determination of pressure existing in the system past the reducing valve 5.

The pressure controlling and sealing device herein illustrated is a three-standpipe combination, the product material entering through standpipe 13, against a constant pressure head of water maintained in standpipe 15 due to the capacity of the storage reservoir 16. The water level in 14 will vary as the back pressure in container 18 varies from 3 to 8 lbs./sq. in. gage, but this will have no effect on the pressure in the testing circuit which will always be maintained at the substantially constant head of 15 by the flow of water into or out of reservoir 16. At eight pounds circuit operating pressure and three pounds gage back pressure the pressure differential between 13 and 14 will be approximately 11.1 feet of water. Pipe 14 is of considerable length for the special reason that when the manufacturing unit is shut down there is sometimes a partial vacuum on 18 and, to avoid drawing water from 14, it has been found necessary to extend this line 14 above reservoir 16. Valve 19 is provided for draining the water from the sealing device when desired.

According to the foregoing installation, pipe 13 was 19 feet in length, pipe 14 was 35 feet, and pipe 15 was 18 feet.

However, other devices may be employed to control the pressure at the required level and the embodiment included herein is intended to be merely illustrative.

In operation (e. g., with dichlorodifluoromethane) the pressure in line 1 should be at a minimum level of not less than about 30 lbs./sq. in. gage. To initially start the testing circuit, reducing valve 5 is gradually opened until the pressure in the circuit is about 14 inches of mercury, as indicated by manometer 10. Valve 5 is then closed and valve 17 opened wide. Then valve 5 is again opened about one-quarter turn. It then is necessary to wait until recorder 6 responds, indicating liquid-vapor equilibrium is reached at reducer 5. If the system has not been in use for an hour or more it may require about fifteen minutes of steady flow to cool the system down to the point where a completely liquid product reaches valve 5.

When liquid flow is attained at valve 5 (as indicated by the action of recorder 6) the setting is adjusted to a steady flow rate of one to two liters vapor flow per minute, as indicated by a pressure differential of one to two inches of water in manometer 12. The flow rate will vary with the pressure existing in line 1 and may have to be adjusted to the desirable flow rate of one to two liters per minute several times during an eight-hour shift to insure accurate recording. A pressure of about 8 lbs./sq. in. gage is preferably maintained in the sampling or testing circuit.

When operating at such pressure, 10 degrees C. should be subtracted from the recorder readings to secure the boiling points of the crude product at atmospheric pressure. For fixed operating conditions the graduations of the recorder chart may be adjusted to correct for the constant 10-degree variance whereupon boiling-point values may be read directly.

The foregoing detailed description sets forth the application of this invention to sampling systems operating under superatmospheric pressures but the invention is equally capable of use with processes where it is desirable to determine boiling points under controlled vacuum conditions.

It will be seen also that this invention is particularly applicable in processes where a determination of the boiling point of a product also determines its composition.

In some cases, regardless of whether testing operation is at super- or sub-atmospheric pressures, it may be desirable to add some heat to the sample material prior to expansion to effect vaporization under the controlled conditions. While the foregoing describes a condition in which it is necessary to cool the sample prior to controlled vaporization, it is apparent that should the material being sampled be at a temperature lower than the equilibrium flashing temperature at thermocouple bulb 25, it will be necessary to heat the sample prior to valve 5 to some temperature above the flashing temperature. The necessity for cooling or heating preceding the controlled vaporization will be determined by the the physical characteristics of the material being tested.

Where constant vacuum conditions are to be maintained in the testing circuit the pressure controlling-sealing device of Fig. 4 may be utilized. In this case leg 15 is located at a lower level than legs 13 and 14, as is also the sealing liquid reservoir 16. With this embodiment of the device it will be apparent that the highest column of liquid will normally be maintained in leg 14 and proper allowance should be made as regards the relative lengths of the three standpipes. Leg 15 is made of suitable length so that the head of the liquid therein will correspond with the vacuum desired to be maintained in leg 13. The absolute pressure maintained in leg 13 must be lower than the absolute pressure existing in line 1 in order to procure flow through and flashing downstream from valve 5. The absolute pressure in receiver 18 may be maintained at any lower absolute pressure than in leg 13. It will be obvious therefore that the pressure controlling-sealing device of this invention is applicable to a great many other processes, and consequently is not limited solely to use in the determination of boiling points. For example, it is capable of use with its accompanying advantages in the control of pressure or vacuum in distillations, catalytic conversion processes, gas or vapor scrubbing and other like industrial operations.

It will become apparent from the foregoing description that this invention may be applied to the control of a wide variety of chemical processes. Also, it will be understood that various types of dryers, filters, reducing valves, and pressure-indicating and controlling devices, or modifications of them, may be employed in the combinations and methods which are herein described and which lie within the scope of the appended patent claims.

I claim:

1. Apparatus for determining the boiling temperature of crude products in a chemical process comprising means for withdrawing a sample portion under pressure from the process, a dryer for removing excess water, means for removing solid and foreign particles, means for reducing the pressure to a substantially constant predetermined point where partial vaporization occurs, means for determining the boiling point of the sample, means for circulating the cooler, partially vaporized expanded material in indirect heat exchange relation with the entering sample material to reduce its temperature, means for completely vaporizing the residual liquid of the sample, means for registering a pressure differential to indicate the rate of flow of the vapors, and a constant pressure controlling and releasing means for maintaining the aforesaid predetermined pressure and for returning the sample to the process.

2. Apparatus for determining the boiling temperature of crude products in a chemical process comprising means for withdrawing a sample portion under pressure from the process, means for ridding the sample of at least a portion of its contaminants which, by virtue of their nature or the proportions in which they are present, do not affect the boiling point of the sample appreciably, means for converting the product to a two-phase equilibrium liquid-vapor state, at a substantially constant, controlled pressure, means for determining the boiling temperature of the sample, means for circulating the cooler, partially vaporized expanded material in indirect heat exchange relation with the entering sample material to reduce its temperature, means for completely vaporizing the residual liquid of the sample, means for determining the rate of flow of the vapors, and a pressure controlling and releasing means for returning the sample to the process.

FREDERICK L. SHANDS.

References Cited in the file of this patent

UNITED STATES PATENTS

| Number | Name | Date |
|---|---|---|
| 883,700 | Drager | Apr. 7, 1908 |
| 1,243,604 | Honeywell | Oct. 16, 1917 |
| 1,632,748 | Parsons et al. | Jan. 14, 1927 |
| 2,036,432 | Musante et al. | Apr. 7, 1936 |
| 2,072,294 | Clemons | Mar. 2, 1937 |
| 2,079,687 | Fourness | May 11, 1937 |
| 2,106,593 | Deniston et al. | Jan. 25, 1938 |
| 2,119,786 | Kallam | June 7, 1938 |
| 2,126,052 | Smith | Aug. 9, 1938 |
| 2,178,519 | Gill | Oct. 31, 1939 |
| 2,339,026 | Mercer | Jan. 11, 1944 |
| 2,341,727 | Krogh | Feb. 15, 1944 |
| 2,380,271 | Sullivan et al. | July 10, 1945 |
| 2,380,977 | Lewis | Aug. 7, 1945 |
| 2,448,315 | Kunzog | Aug. 31, 1948 |
| 2,499,105 | Mercer | Feb. 28, 1950 |